United States Patent [19]

Mansour

[11] Patent Number: 5,255,634

[45] Date of Patent: * Oct. 26, 1993

[54] PULSED ATMOSPHERIC FLUIDIZED BED COMBUSTOR APPARATUS

[75] Inventor: Momtaz N. Mansour, Columbia, Md.

[73] Assignee: Manufacturing and Technology Conversion International, Inc., Md.

[*] Notice: The portion of the term of this patent subsequent to Jul. 28, 2009 has been disclaimed.

[21] Appl. No.: 871,965

[22] Filed: Apr. 22, 1992

Related U.S. Application Data

[63] Continuation-in-part of Ser. No. 689,336, Apr. 22, 1991, Pat. No. 5,133,297.

[51] Int. Cl.$^5$ .............................. B09B 3/00; F22B 1/00
[52] U.S. Cl. ........................................ 122/4 D; 122/24; 431/1
[58] Field of Search ............... 110/245, 347; 122/4 D, 122/24; 431/1; 432/58

[56] References Cited

U.S. PATENT DOCUMENTS

| | | |
|---|---|---|
| 2,539,466 | 1/1951 | Parry . |
| 2,619,415 | 11/1952 | Hemminger . |
| 2,623,815 | 12/1952 | Roetheli et al. . |
| 2,680,065 | 6/1954 | Atwell . |
| 2,683,657 | 7/1954 | Garbo . |
| 2,937,500 | 5/1960 | Bodine, Jr. . |
| 2,979,390 | 4/1961 | Garbo . |
| 3,246,842 | 4/1966 | Huber . |
| 3,333,619 | 8/1967 | Denis . |
| 3,606,867 | 9/1971 | Briffa . |
| 3,966,634 | 6/1976 | Sacks . |
| 4,368,677 | 1/1983 | Kline . |
| 4,529,377 | 7/1985 | Zinn et al. . |
| 4,655,146 | 4/1987 | Lemelson . |
| 4,655,147 | 4/1987 | Brannstrom et al. ............... 122/4 D |
| 4,682,985 | 7/1987 | Kohl . |
| 4,699,588 | 10/1987 | Zinn et al. . |
| 4,708,159 | 11/1987 | Lockwood, Jr. . |
| 4,773,918 | 9/1988 | Kohl . |
| 4,909,731 | 3/1990 | Zinn et al. . |
| 4,951,613 | 8/1990 | Harandi et al. . |
| 5,133,297 | 7/1992 | Mansour .............................. 122/4 D |

FOREIGN PATENT DOCUMENTS

| | | |
|---|---|---|
| 3109685 | 9/1982 | Fed. Rep. of Germany . |
| 2301633 | 9/1976 | France . |
| 8200047 | 1/1982 | PCT Int'l Appl. . |
| 644013 | 10/1950 | United Kingdom . |
| 665728 | 1/1952 | United Kingdom . |
| 1544446 | 4/1979 | United Kingdom . |

OTHER PUBLICATIONS

Patent Abstracts of Japan, JP1080437, Mar. 27, 1989.
Soviet Inventions Illustrated, SU879-146, Feb. 29, 1980.

*Primary Examiner*—Edward G. Favors
*Attorney, Agent, or Firm*—Dority & Manning

[57] ABSTRACT

A pulsed atmospheric fluidized bed reactor system is disclosed and claimed along with a process for utilization of same for the combustion of, e.g. high sulfur content coal. The system affords a economical, ecologically acceptable alternative to oil and gas fired combustors. The apparatus may also be employed for endothermic reaction, combustion of waste products, e.g., organic and medical waste, drying materials, heating air, calcining and the like.

26 Claims, 9 Drawing Sheets

PULSED ATMOSPHERIC FLUIDIZED BED COMBUSTOR APPARATUS

This is a continuation-in-part of application Ser. No. 07/689,336 filed Apr. 22, 1991 Pat. No. 5,133,297 in the United States Patent and Trademark Office.

TECHNICAL FIELD

The present invention relates to a pulsed fluidized bed reaction apparatus and process for combustion of solid fuels and other operations in an efficient, environmentally acceptable, and economical manner.

BACKGROUND ART

Many technologies have been developed and/or demonstrated for utilizing high-sulfur fuels in general and coals in particular. From a performance, emissions, and economics standpoint, fluidized bed combustion technology has emerged as a leading candidate for utilizing high sulfur fuels. Many fluidized bed combustion engines are available and are at various states of commercialization. Such systems can be classified in terms of operating pressure (atmospheric or pressurized) and fluidization mode (bubbling or circulating). All the fluidized bed designs possess attributes such as in-situ sulfur capture, no slagging or fouling of heat transfer surfaces, high heat transfer rates to heat exchange surfaces, near uniform temperature in combustion zone, and fuel flexibility. These features have made it possible for fluidized bed combustion technology to compete successfully for the large industrial boiler market (6.3–37.8 kg/s or 50,000–300,000 lb/hr steam). Large-scale (70 to 150 MW$_e$) field demonstration projects are in progress to facilitate commercialization in the utility sector. The potential of fluidized bed combustion technology, and specifically, atmospheric fluidized bed combustion for small-scale (<6.3 kg/s or 50,000 lb/hr steam equivalent) applications have, however, not been explored seriously until recently.

Atmospheric fluidized bed combustion technology appears to have a great potential for oil and gas replacement in small-scale installations of less than 6.3 kg/s (50,000 lb/hr) steam equivalent. These smaller units can meet the needs of process heat, hot water, steam, and space heating in the residential, commercial, and industrial sectors. Currently, oil and natural gas-fired equipment are being used almost exclusively for these applications. Due to the large difference between the prices of these fuels and coal, coal-fueled atmospheric fluidized bed combustion technology engineered for small-scale applications has the potential of becoming very competitive under economic conditions in which the price differential overcomes the initial capital cost of the coal-based system. A successful coal-fueled system cannot only be more economical, but can also reduce the nation's dependence on foreign oil and open up new markets for domestic coal and the coal-fueled fluid-bed technologies.

Market analysis indicates that a coal-based system that provides competitive levels of capital and operation and maintenance costs, performance, and reliability at the 0.126 to 1.26 kg/s (1,000 to 10,000 lb/hr) steam generation rate can displace as much as 2.64 EJ (2.5 quad Btu) of gas and oil within the residential, commercial, and light industrial sectors. In the industrial sector, systems from 1.26 to 6.3 kg/s (10,000 to 50,000 lb/hr) steam can displace another 1.16 EJ (1.1 quad Btu) of energy per year.

As pointed out earlier, the atmospheric fluidized bed combustion systems can be classified into bubbling-bed and circulating-bed systems. In a coal-fueled bubbling-bed system, it is critical to control the extent of fines (elutriable particles) in the coal and sorbent feed in order to limit particle carryover and its adverse effect on combustion and sulfur capture performance, emissions, and the size of solids collection equipment. Additionally, the higher Ca/S feed ratios typically required in bubbling fluidized combustion applications tend to increase sorbent and waste disposal costs, and turndown capability is rather limited. A circulating fluidized bed combustion system exhibits higher combustion efficiency and sorbent utilization, lower NO$_x$ emissions due to multiple air staging, and greater fuel flexibility and turndown as compared to a bubbling type system. However, the circulating type system requires a tall combustor to accommodate sufficient heat exchange surface. Such makes it both impractical and expensive to scale-down circulating fluidized bed combustors to sizes significantly smaller than 12.6 kg/s (100,000 lb/hr) steam equivalent.

Fluid bed systems in general tend to have large thermal inertia. Start-up for large fluid bed systems requires a considerable amount of time and also auxiliary subsystems to preheat the beds in a controlled manner. Both add to overall system cost and complexity. Concepts which provide a simple compact design for fast start-up with low-cost hardware and also have simple operational characteristics are a must for small-scale applications. Thermal inertia of fluid bed systems also affects load following to some extent and this has also been a serious shortcoming for scale-down to small end-use applications. System designs must provide fast response to load changes, particularly through auxiliary firing subsystems and methods of bed heating. Such designs should not require additional hardware and control systems if the system capital cost is to be maintained sufficiently low to compete favorably with existing oil and gas equipment. In addition, new designs capable of higher throughput for a given combustor size will contribute to a reduction in capital cost per kJ/hr (Btu/hr) of fuel fired. This must be achieved, however, without compromising the pollution control performance of equipment intended to meet stringent requirements in some of these end-use applications.

Simply scaling-down existing large atmospheric fluidized bed combustion systems to a size range suitable for small end-use sectors of interest will result in complex and expensive systems that will not be competitive with presently available oil- and gas-fired equipment. New innovative approaches are needed to reduce cost and enhance performance.

Such a new system should therefore possess a number of attributes, such as high combustion efficiency; high sulfur capture capacity; low N$_x$ emissions; and should be capable of rapid start-up with load-following capability. Also, such systems, as with most systems, should be of a simple design with inexpensive, easily managed controls to afford a reliable, safe system. Last, but not least, the system should be at least technologically and economically equivalent to oil- and gas-fired packaged systems.

The apparatus and process according to the present invention overcome the above-noted problems of the prior art and possess the attributes set forth above.

DISCLOSURE OF INVENTION

It is thus an object of the present invention to provide an improved combustor.

Another object of the present invention is to provide an improved combustor that operates on high sulfur fuels such as coals while avoiding unwanted emissions.

Still another object according to the present invention is to provide an improved fluidized bed combustor.

Yet another object according to the present invention is to provide a pulsed fluidized bed combustor capable of economical operation with high sulfur fuels.

Another object of the present invention is to provide a pulsed atmospheric fluidized bed reactor.

Still another object according to the present invention is to provide a pulsed fluidized bed combustor that may be down-sized to economically operate at 50,000 pounds per hour steam equivalent or less.

Another object according to the present invention is to provide an improved process for the combustion of high sulfur fuels.

It is still another object according to the present invention to provide an improved process for combusting solid fuels in a fluidized bed environment.

Generally speaking, apparatus according to the present invention includes a reactor vessel; means for feeding a fluidizable solid material into said vessel intermediate the height of same; means for supplying a fluidizing medium for said solid material into said vessel to establish a fluidized bed of solid material therebetween; a pulse combustor unit extending into said vessel, said pulse combustor unit comprising a combustion chamber, valve means associated with said combustion chamber for admitting a fuel-air mixture thereto, a resonance chamber in communication with said combustion chamber and extending outwardly therefrom, an outer free end of said resonance chamber being located with respect to said fluidized bed to permit gaseous products from said resonance chamber to act thereon; and flue gas exhaust means in communication with said vessel to exhaust products of combustion therefrom.

Generally speaking, the process according to the present invention includes the steps of establishing and maintaining a fluidized bed of solid fuel within a vessel therefor and about a heat transfer means; pulse combusting a fuel-air mixture in a fashion to create a pulsation flow of combustion products and an acoustic wave therefrom; directing said pulsating flow of combustion products to act directly on said fluidized bed of solid fuel for combustion of said solid fuel; and exhausting products of combustion from said vessel after separation of entrained solids therefrom.

BRIEF DESCRIPTION OF DRAWINGS

The construction designed to carry out the invention will be hereinafter described, together with other features thereof. The invention will be more readily understood from a reading of the following specification and by reference to the accompanying drawings forming a part thereof, wherein an example of the invention is shown and wherein.

MODES FOR CARRYING OUT THE INVENTION

Figure 1:
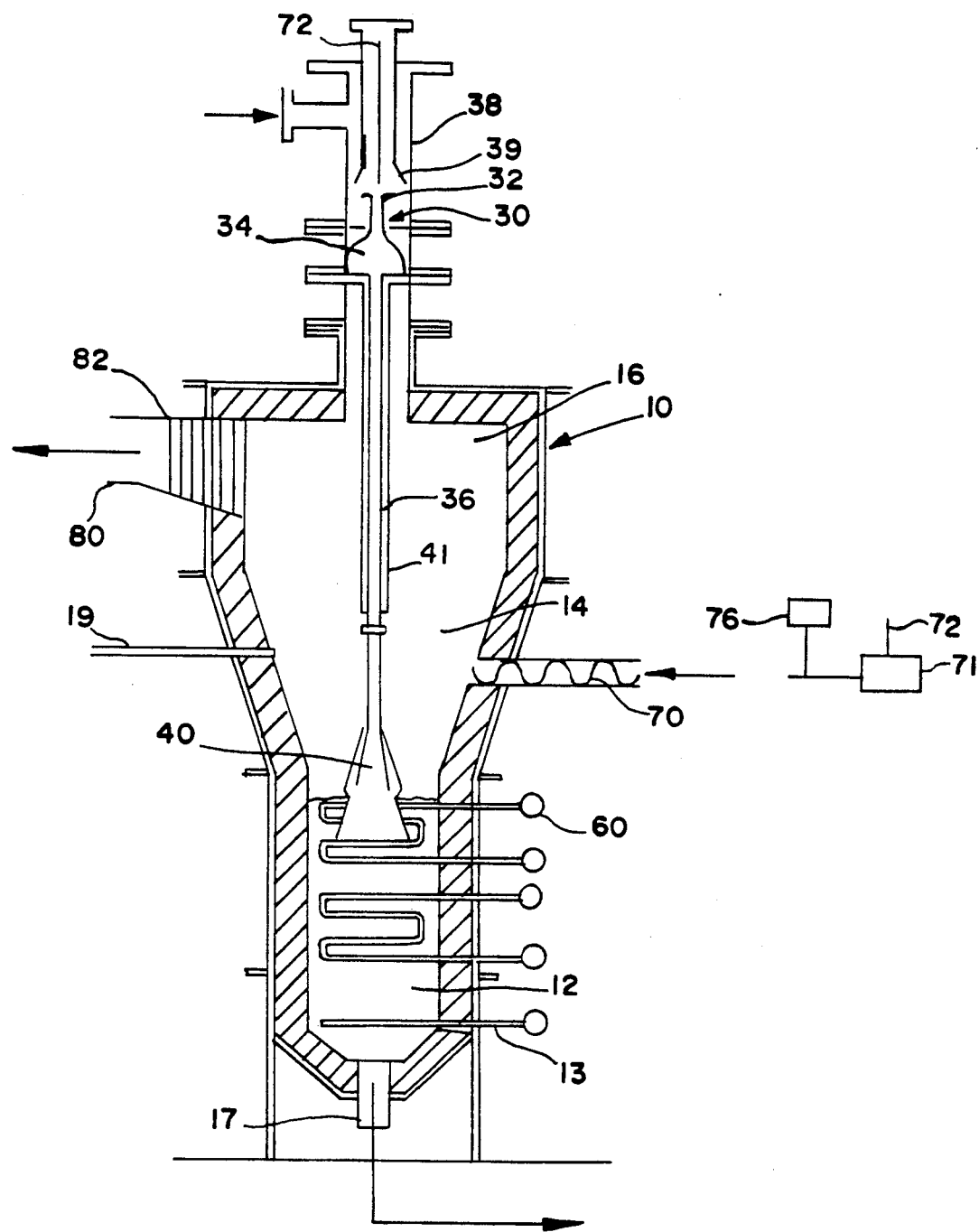
FIG. 1 is a schematic illustration of a pulsed atmospheric fluidized bed reactor according to teachings of the present invention.

The preferred system according to the present invention integrates a pulse combustor with an atmospheric bubbling-bed type fluidized bed combustor as illustrated in FIG. 1. In this modular configuration, the pulse combustor burns the fuel fines which are less than 30 seive or 600 microns and the fluidized bed combusts the coarse solid fuel particles.

As shown in FIG. 1, the pulsed atmospheric fluidized bed apparatus according to the present invention includes a refractory-lined vessel generally 10 in which the fluidized bed will be produced. A pulse combustor generally 30 is integrated with vessel 10 to afford the advantages set forth herein.

Vessel 10 includes a lower section 12, an intermediate section 14, and an upper section 16. Located in lower section 12 of vessel 10 is a fluid distribution means 13 through which fluid may be introduced adequate in velocity to fluidize solids located in lower section 12. Generally speaking, it has been found that fluid velocities in a range of from about 4 to about 13 feet per second are adequate for fluidization. Also located within lower section 12 where the dense fluidized bed will be formed are a plurality of tubes or conduits 60 through which a heat exchange medium may be passed to remove heat from the fluidized bed. Typically, air or water would be circulated through heat exchange tubes 60 to produce heated air, hot water or steam though other materials may be passed therethrough for an intended result.

Intermediate vessel section 14 flares outwardly and connects lower section 12 with upper section 16, with intermediate section 14 and upper section 16 forming what is referred to as the freeboard area of a fluidized bed system, in which gas velocity decreases, gas residence time increases and elutriation decreases. Conversely, the dense fluidized bed in lower vessel section 12 operates in a bubbling, turbulent mode.

Pulse combustor 30 includes valve means 32 which may be an aerodynamic valve or fluidic diode, a mechanical valve or the like, a combustion chamber 34 and a tailpipe 36. Additionally, pulse combustor 30 includes an air plenum 38 and a thrust augmenter 39. Tailpipe or resonator tube 36 may be a single tube as shown or a plurality of tubes and in a preferred embodiment has a diffuser section 40 located at a free end of same. Likewise in a preferred embodiment tailpipe 36 has a water jacket 41 surrounding at least a portion of the length of same.

Figure 7:
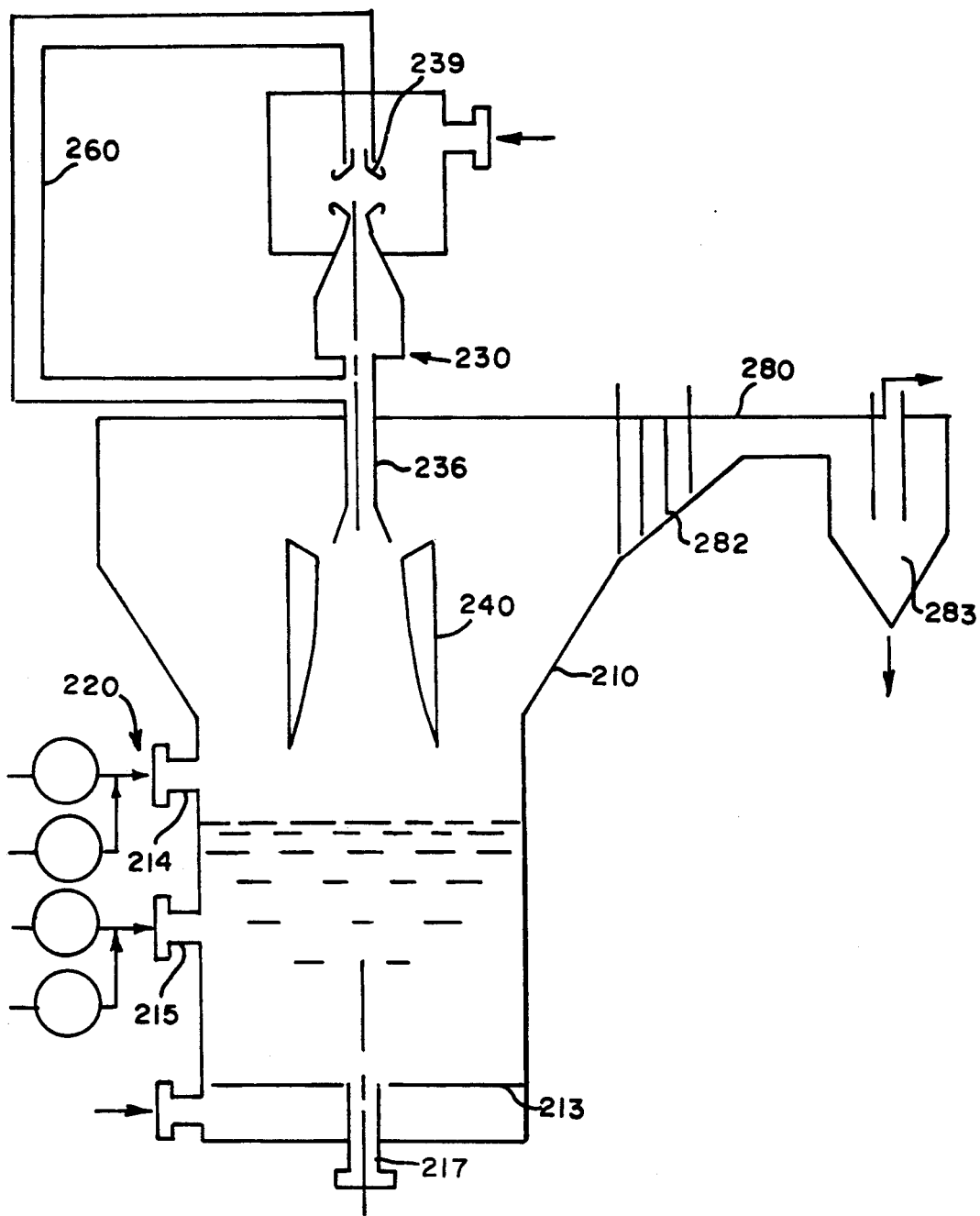
FIG. 7 is a schematic illustration of a pulsed atmospheric fluidized bed reactor for incineration of waste according to the teachings of the present invention.
Figure 8:
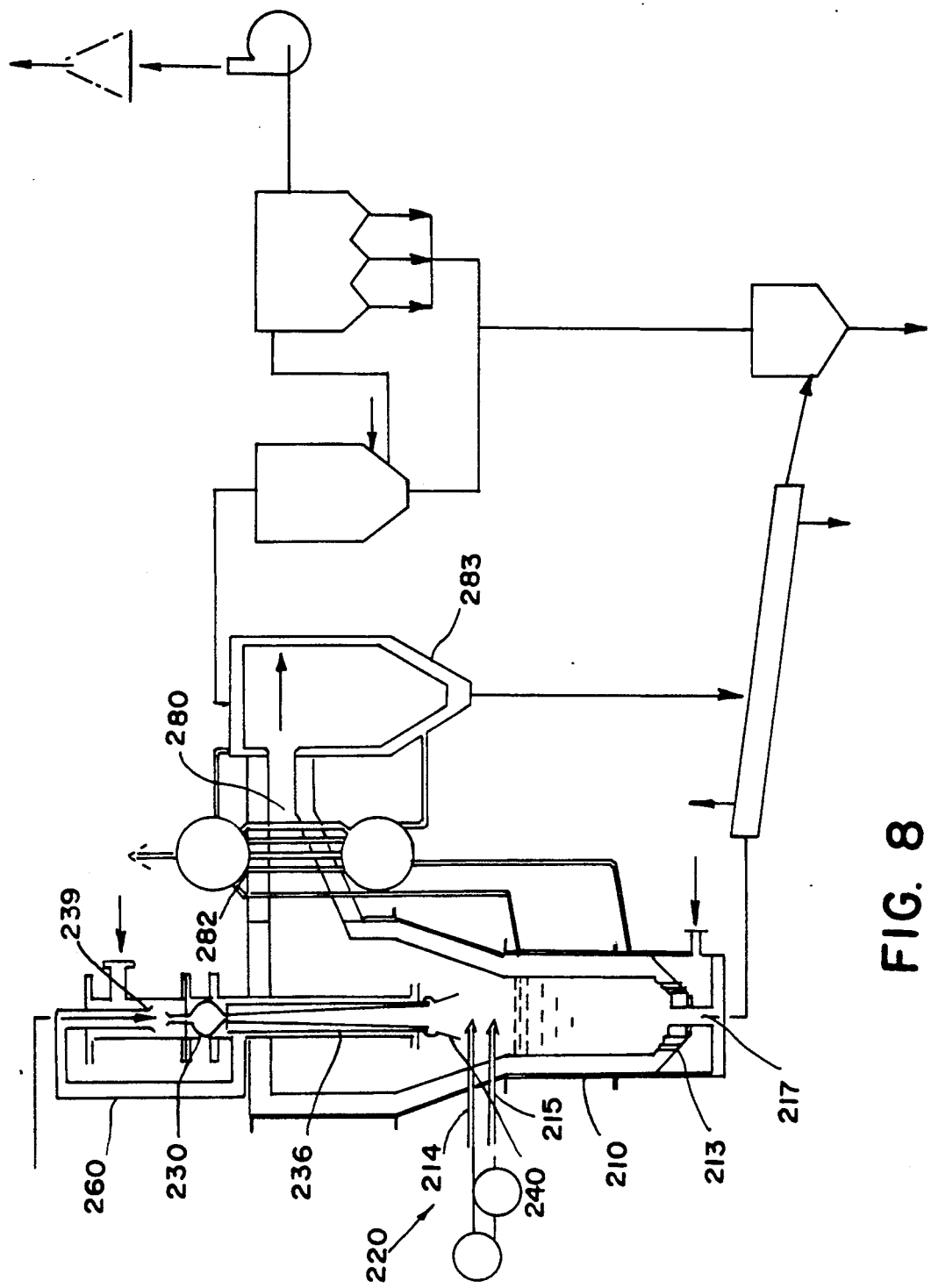
FIG. 8 is the pulsed atmospheric fluidized bed reactor of FIG. 7 in a waste incineration environment.

Diffuser section 40 at the end of tailpipe 36 forms an expansion section which reduces the gas exit velocity from tailpipe 36 and prevents channeling in the fluidized bed. After the flue gas from the pulse combustor 30 exits the tailpipe 36 it enters the diffuser section 40 which provides fines recirculation and increased particle residence time in the bed. The diffuser section and/or open end of the tailpipe may extend into the bed of reactants or may be positioned above the bed of reactants (as shown in FIGS. 7 and 8). Vessel 10 also includes an overbed coarse fuel and sorbent feed system 70, preferably a screw conveyor, and a fuel classifier 71 for separating fuel feed into coarse fraction and fines.

Fines are fed from classifier 71 via line 72 to pulse combustor 30 while the coarse fuel component is fed from classifier 71 to feed system 70. Sorbent such as crushed limestone is fed from a supply hopper 76 to feed system 70 for introduction to vessel 10. While the fuel/sorbent mixture may vary, sorbent content is preferably maintained at a level of two to three times the sulfur ratio of the solid fuel, e.g., coal.

Vessel 10 further includes a product gas exit conduit 80 having a gas solids separator 82, preferably an inertial separator at the entrance thereof to separate elutriated fines from the exit gas stream and return same to upper section 16. Waste rock, ash and the like are discarded from vessel 10 through port 17 located at a lower end of same. A burner 19 is also provided for vessel 10, preferably fired by natural gas to be employed for operational safety and start-up of the system.

A pulse combustor typically includes a flow diode, a combustion chamber and a resonance tube. Fuel and air enter the combustion chamber. An ignition source detonates the explosive mixture in the combustion chamber during start-up. The sudden increase in volume, triggered by the rapid increase in temperature and evolution of combustion products, pressurizes the chamber. As the hot gas expands, the valve, preferably a fluidic diode, permits preferential flow in the direction of the resonance tube. Gases exiting the combustion chamber and the resonance tube possess significant momentum. A vacuum is created in the combustion chamber due to the inertia of the gases within the resonance tube. The inertia of the gases in the resonance tube permits only a small fraction of exhaust gases to return to the combustion chamber, with the balance of the gas exiting the resonance tube. Since the chamber pressure is below atmospheric pressure, air and fuel are drawn into the chamber where autoignition takes place. Again, the valve constrains reverse flow, and the cycle begins anew. Once the first cycle is initiated, engine operation is thereafter self-sustaining.

The flow diode utilized in many other pulse combustion concepts is a mechanical "flapper valve." The flapper valve is actually a check valve permitting flow from inlet to chamber, and constraining reverse flow by a mechanical seating arrangement. This served quite well for the purpose intended. While such a mechanical valve may be used in conjunction with the present system, an aerodynamic valve without moving parts is preferred. During the exhaust stroke with an aerodynamic valve, a boundary layer builds in the valve and turbulent eddies choke off much of the reverse flow. Moreover, the exhaust gases are of a much higher temperature than the inlet gases. Therefore, the viscosity of the gas is much higher and the reverse resistance of the inlet diameter, in turn, is much higher than that for forward flow through the same opening. These phenomena, along with the high inertia of the exhausting gases in the resonance tube, combine to yield preferential and mean flow from inlet to exhaust. Thus, the preferred pulse combustor is a self-aspirating engine, drawing its own air and fuel into the combustion chamber and auto-ejecting combustion products.

Rapid pressure oscillations in the combustion chamber generate an intense oscillating flow field. In the case of coal combustion, the fluctuating flow field causes the products of combustion to be swept away from the reacting solid thus providing access to oxygen with little or no diffusion limitation. Second, pulse combustors experience very high mass transfer and heat transfer rates within the combustion zone. While these combustors tend to have very high heat release rates (typically 10 times those of conventional burners), the vigorous mass transfer and high heat transfer within the combustion region result in a more uniform temperature. Thus, peak temperatures attained are much lower than in the case of conventional systems. This results in a significant reduction in the formation of nitrogen oxides ($NO_x$). The high heat release rates also result in a smaller combustor size for a given firing rate and a reduction in the residence time required.

Performance of atmospheric fluidized bed combustors is affected by the rate of combustion of coal, which in turn is affected by coal properties (devolatilization, swelling, fragmentation, and char combustion), feed particle size range, feed system and combustion-enhanced mechanic attrition, heat and mass transfer rates, and unit operating conditions. Furthermore, for such systems the carbon carryover into the primary particle separator is generally high due to limited residence time of fuel fines in the combustor. To achieve high carbon utilization efficiency, recycling of fines to the bed has often been practiced. These recycle processes add to system complexity and cost and, at times, are prone to plugging. According to the present invention, higher combustion efficiency can be attained because the fuel fines are burned in the pulse combustor and only the coarse coal which has been classified is burned in the fluid bed.

The three "T"s of combustion, namely, 1) temperature, 2) turbulence, and 3) residence time for the pulse combustor and the bubbling fluid-bed freeboard are quite different, as shown below.

|  | Pulse Combustor | Atmospheric Fluidized Bed Freeboard Zone |
| --- | --- | --- |
| Temperature | >1092° C. or 2000° F. (High) | 843° C. or 1550° F. (Low) |
| Turbulence | Very High (Oscillatory) | Moderate (Plug f with back mixing) |
| Gas Residence Time | 10 to 100 milliseconds | 2 to 3 seconds |

Since the present invention employs both a pulse combustor and an atmospheric fluidized bed combustor, it can handle the full size range of coarse fuel and fines. The oscillating flow field in the pulse combustor provides for high interphase and intraparticle mass transfer rates. Therefore, the fuel fines essentially burn under kinetic control. Due to the reasonably high temperature (>1093° C. but less than the temperature for ash fusion to prevent slagging), combustion of fuel fines is substantially complete at the exit of the pulse combustor. The additional residence time of 1 to 2 seconds in the freeboard zone of the fluidized bed unit ensures high carbon conversion and, in turn, high combustion efficiency.

Devolatilization and combustion of fuel fines in the pulse combustor also enable the release of a significant portion of sulfur by the time the fuel fines leave the tailpipe or resonance zone. This sulfur has a high probability of capture in the dense fluid bed due to the pulse combustor effluxing into the fluid bed. The acoustic field radiated into the fluid bed enhances the mass transfer rate and in turn increases the reaction rate between the sorbent and $SO_2$. Acoustic enhancement in the fluid bed mass transfer process, and the fines recirculation as a consequence of the draft tube design, help achieve high sulfur capture efficiency at low Ca/S molar feed ratio which leads to lower limestone and waste disposal costs.

Pulse combustors are inherently low $NO_x$ devices. The rate of heat transfer in the pulsating flow is higher than that in conventional steady flow and helps create lower overall temperature in the combustion chamber. Also, the high rates of mixing between the hot combustion products and the colder residual products from the previous cycle and the incoming cold reactants create a short residence time at high temperature quenching the $NO_x$ production. These complementary mechanisms create an environment which approximates a well-stirred tank at relative low temperature and result in low $NO_x$ production. The dense fluid bed in the lower section 12 of vessel 10, due to operation at low temperature and with coarse fuel particles, enjoys a lower $NO_x$ production as well. Consequently, the $NO_x$ emissions from systems of the present invention are believed to be lower than that of conventional fluid bed combustors.

The overall heat transfer coefficient in the water-jacketed pulse combustor tailpipe is of the same order as that for tubes immersed in the dense fluidized bed. The replacement of the inefficient heat exchanger in the freeboard zone of a conventional bubbling fluidized bed combustor by the water-jacketed pulse combustor tailpipe significantly decreases the heat transfer surface area requirement and cost.

Figure 2:
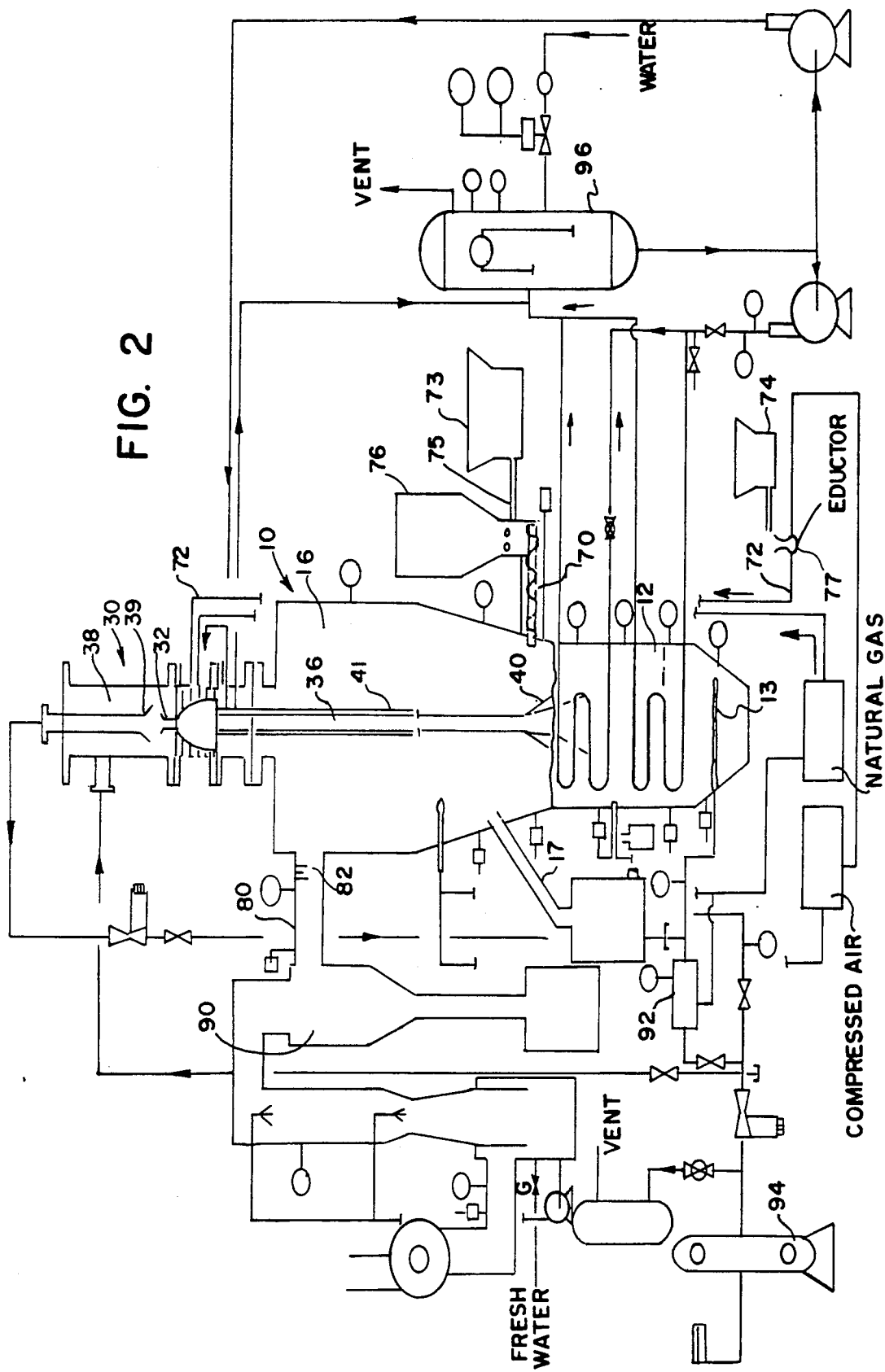
FIG. 2 is a schematic illustration of the pulsed atmospheric fluidized bed reactor of FIG. 1 in a coal fuel combustion environment.

In order to establish the technical merit of the technology according to the present invention, a laboratory-scale system (1.58 GJ/hr—1.5 MMBtu/hr—coal firing rate) was designed, built and tested. A schematic of the unit is shown in FIG. 2. The primary objective of this work was to investigate the integration of a pulse combustor with the fluidized bed portion of a furnace. A convective section was not included since the additional expense was considered unjustified. Therefore, the steam output and the thermal efficiency of the unit tested are somewhat lower than those expected in normal practice.

In FIG. 2, the apparatus as described with respect to FIG. 1 is illustrated, with like members assigned like numbers, in conjunction with related process equipment. After classification of solids, e.g., coal, into fines and coarse particles (not shown), the coarse particles are maintained in coal bin 73 from which the particles are fed by a conveyor 75 into a sorbent feed bin 76 where sorbent is fed into the coal supply as noted hereinbefore. The coal-sorbent mixture is then fed to vessel 10 by feed conveyor 70 and falls onto the dense bed located in lower section 12 of vessel 10 which is being maintained in a bubbling fluidized state by fluid entering therebeneath through fluid distributor means 13. Alternatively, the coal-sorbent mixture could be fed directly into the fluidized bed instead of falling onto the top of the bed (see FIG. 7 for such a structure employing feeding means 214 and 215 at both locations).

Fines separated from the coal are stored in a bin 74 therefor and are fed to an eductor 77 where they are transported via line 72 to pulse combustor 30. Assuming that pulse combustor is in an operational state, aerodynamic valve 32 pulls in an air-feed mixture on demand. As shown in FIG. 2, natural gas is also fed to pulse combustor valve 32 where it also serves as fuel. Products of combustion from pulse combustor 30 then proceed with an oscillating acoustic pressure wave through resonance tube or tailpipe 36, through diffuser section 40 and into the fluidized bed. Generally speaking, heat release rate in pulse combustor 30 is in a range of from about 2 to about 6 MM Btu/hr/ft$^3$, with product gas temperature in a range of from about 1400° to about 3500° F. Gas velocity in the resonance tube is in a range of from about 150 to about 1600 feet per second with velocity oscillation in a range of from about 20 to about 150 Hertz.

In the vessel, acoustic pressure wave levels in a range of from about 100 to about 185 dB are achievable. Likewise, temperatures are achievable in the vessel 10 up to about 2000° F. based on volumetric heat releases from the pulse combustor in a range of from about 100,000 to about 200,000 Btu/hr/ft$^3$. Temperatures in the freeboard zone of vessel 10 may then exceed 2000° F., and are capable of destruction of organic materials. In the fluidized bed, temperatures in a range of from about 1500 to about 1700° F. are desired to minimize nitrogen oxides.

The acoustic wave exiting diffuser section 40 and impacting in the fluidized bed brings about enhanced mixing and heat transfer. The solid fuel in fluidized state is combusted while temperatures in the bed may be controlled by a heat transfer medium passing through tubes 60 submerged in the fluidized bed. Obviously heat transfer from the bed to the medium may be used to both control the overall temperature of the fluidized bed and/or to create a desired resultant effect on the medium, i.e., to heat water or air, to produce steam or the like.

Products of combustion then rise above the fluidized bed into the freeboard zone, where further heat transfer or reaction may take place, and from the freeboard zone through entrained solids separator 82 and out the flue gas exit 80 to cyclone 90. Since the fuel has been classified, minimal fines are elutridated into the freeboard zone, thus again lessening the release of sulfur.

Also in the overall scheme of operation, the fluidizing medium, e.g., air or steam may be preheated in preheater 92. Fluidizing medium is supplied to preheater 92 by a primary air blower 94 and/or return of excess air or other fluid from pulse combustor 30. Likewise as illustrated, steam generated in tubes 60 passes therefrom to a steam drum 96 and from drum 96 as desired.

In a high sulfur coal burning process, limestone and coarse, classified coal are fed onto the fluidized bed within vessel 10 while the fines are fed, as noted above, to pulse combustor 30 as a fuel source. Sulfur in the fines is basically removed in the pulse combustor and is picked up by the limestone in the fluidized bed. Likewise, sulfur in the coarse coal is captured by limestone in the bed in a more efficient manner than in prior art systems. To accomplish such, temperatures in the fluidized bed are preferably maintained in a range of from about 1400° to about 1750° F. Likewise in this temperature range less nitrogen oxide byproducts are produced.

A total of 28 tests were performed on apparatus as shown in FIG. 2, including shakedown and characterizations tests. The unit was tested both with and without the pulse combustor, and test parameters are given in Table 1. The system was on-line for more than 200 hours and combusted nearly 9 tons of coal. $N_2O$ emissions measurements were made in collaboration with Drs. L. J. Muzio and G. Shiomoto of Fossil Energy Research Corporation, Laguna Hills, Ca.

TABLE 1

Test Parameters

| | |
|---|---|
| Coal Type: | Pittsburgh No. 8, W. Kentucky Nos. 9 and 11 |
| Coal Size Distribution: | 9.5 mm (⅜") by 0 with 15-40% fines by wt. |
| Limestone: | Shasta |
| Limestone Size Distribution: | 3.2 mm (⅛") by 0 |
| Superficial Gas velocity: | 1.52-2.13 m/s (5-7 ft/s) |
| Bed Temperature: | 815-871° C. (1500-1600° F.) |
| Ca/S Ratio: | 2.5-2.7 |
| Bed Area: | 0.61 m × 0.61 m (2' × 2') |
| Furnace Height: | 3.05 m (10') |
| Pulse Combustor Fuel: | Coal, Gas |

A summary comparison of the performance and emissions data from the 0.61 m×0.61 m (2'×2') facility according to the present invention with those from conventional bubbling fluidized bed combustors (taller freeboard and recycle operation) and circulating fluidized bed combustor units is given in Table 2. The comparison is for typical high-volatile bituminous coals and sorbents of average reactivity. The values indicated for the prior art fluidized bed combustors are based on published information. It is seen that the system according to the present invention exhibits superior performance in relation to the prior art. The higher combustion efficiency translates into reduced coal consumption and lower system operating cost; the improvement in sulfur capture implies less sorbent requirement and waste generation and, in turn, lower operation cost; lower $NO_x$ and CO emissions mean ease of siting; and greater steam-generation rate translates into less heat exchange surface area and reduced capital cost. Also, it seems that $N_2O$ emissions from this pulsed fluidized bed technology are not insignificant but are comparable to published data on $N_2O$ emissions indicating that the mode of operation does not have much influence on $N_2O$ emissions. In summary, the present system performance generally (i) surpasses those of the conventional systems, (ii) is comparable to circulating fluidized bed combustion in combustion and $N_2O$ emissions, and (iii) is better than circulating fluidized bed combustors in sulfur capture and CO and $NO_x$ emissions.

TABLE 2

Performance Characteristics of Fluidized Bed Combustors

| | Atmospheric Bubbling | Pulsed Atmospheric Bubbling | Bubbling* | Circulating* |
|---|---|---|---|---|
| Combustion Efficiency % | 89-93 | 92-97 | 90-97 | 93-99 |
| $SO_2$ Capture Effic. (%) | 70-85 | 90-98 | 70-85 | 75-95 |
| $NO_x$ Emissions (ppmv)+ | 155-620 | 110-265 | 400-500 | 100-300 |
| $N_2O$ Emissions (ppmv)+ | 70-100 | 70-100 | 10-220 | 10-220 |
| CO Emissions (ppmv)+ | 400-1600 | 180-800 | 400-1200 | 500-1500 |
| Steam Rate kg/s (lb/hr) | 227-317 (500-700) | 363-372 (800-820) | | |

Test Parameters

| | |
|---|---|
| Bed Temperature | 815-871° C. (1500-1600° F.) |
| Ca/S Ratio | 2.5-2.7 |
| Coal | Bituminous (high volatile) |

*Based on literature data
+At 3% $O_2$

These factors indicate the present invention to be an attractive option at any scale. It is impractical and expensive to scale-down a circulating fluidized bed combustor to the 0.126 to 6.3 kg/s (1,000 to 50,000 lb/hr) steam equivalent range as noted above.

Apparatus as described heretofore has been directed primarily to a system for combusting high sulfur content coal. Such apparatus, particularly as described with respect to FIG. 1, can also be employed for improved combustion of other products such as, by way of example, biomass, waste products exemplified by medical waste, industrial waste, organics and the like and for endothermic reactions, drying, calcining and the like.

Figure 3:
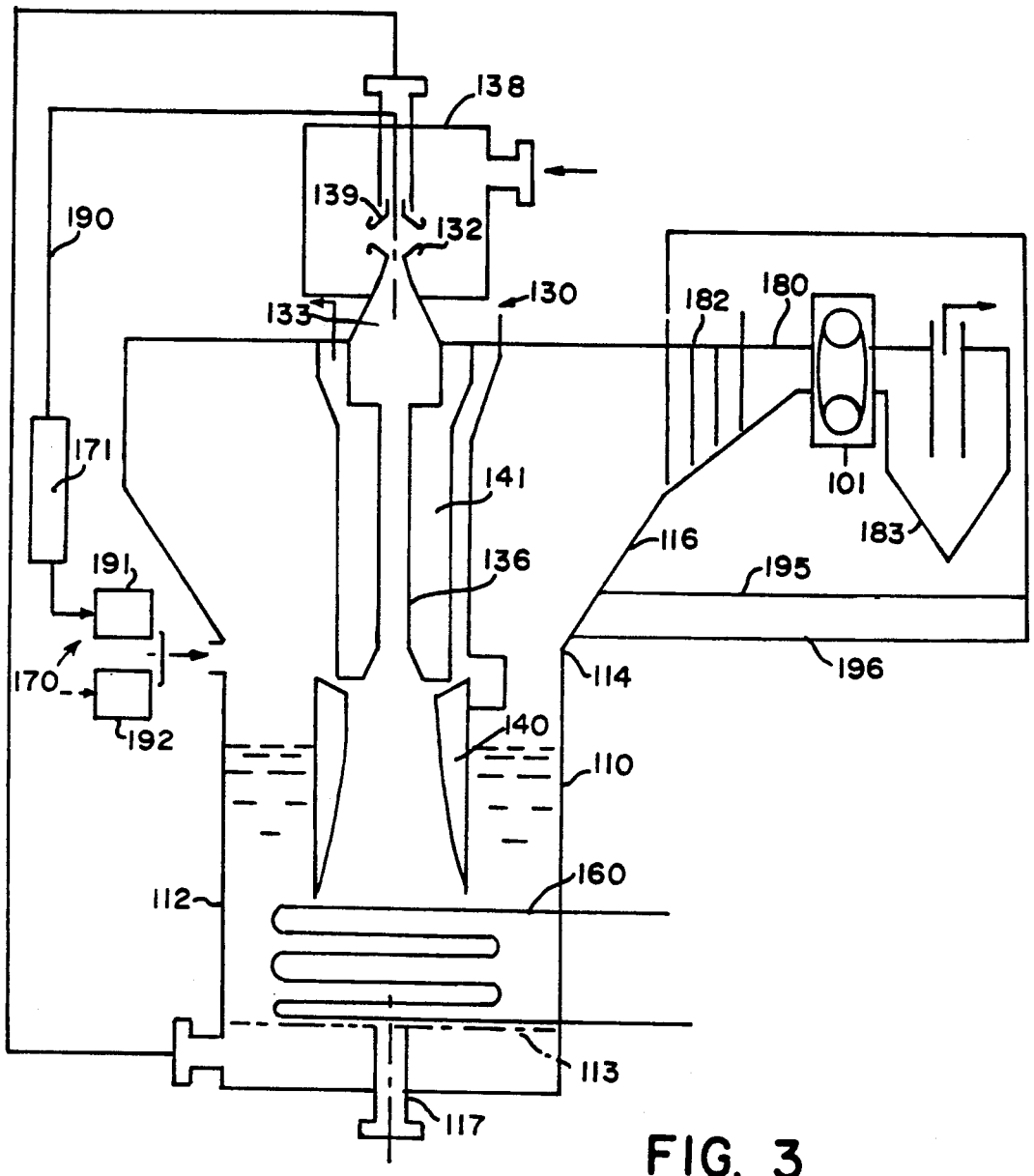
FIG. 3 is a schematic illustration of a pulsed atmospheric fluidized bed reactor designed for steam generation according to the teachings of the present invention.

One such apparatus according to the present invention is useful for the generation of steam and is shown in FIG. 3. The steam generation apparatus employs a means similar to the embodiment described above. A pulse combustor means indicated generally as 130 is integrated with a refractory-lined reaction vessel 110. Vessel 110 includes a lower section 112, an intermediate section 114, and an upper section 116 with intermediate section 114 and upper section 116 forming the previously-described freeboard area.

A fluidizing means 113 through which fluid may be introduced adequate in velocity to fluidize solids in a bed and to control bed temperature is located in lower section 112. In one embodiment of the steam generation apparatus, fluidizing means 113 utilizes a water-cooled distributor plate. A plurality of tubes or conduits 160 through which water or other heat exchange medium may pass is located within lower section 112 where the dense fluidized bed of combustion materials will be formed. These conduits form the means for transferring, or withdrawing, heat from the fluidized bed. As will be explained hereinafter, tubes 160 may form a "D" type water/steam circuit configuration.

As previously described, intermediate vessel section 114 flares outwardly and connects lower section 112 with upper section 116. The dense fluidized bed in lower vessel section 112 operates in a bubbling, turbulent mode.

Pulse combustor means 130 may include the previously described valve means comprising one or more openings through which a fuel-air mixture may be introduced into combustion chamber 133, air plenum 138 and thrust augmenter 139. Tailpipe or resonator tube 136 may be a single tube as shown or a plurality of tubes and, preferably, has a diffuser section 140 at its end. Diffuser section 140 provides for fines recirculation and increased particle resonance time in the fluidized bed for enhanced combustion and sulfur capture.

As with each of the embodiments described herein, part of the combustion chamber may be integral with vessel 110 and a portion of pulse combustor means 130 (such as diffuser section 140 in FIG. 3) may extend into the fluidized bed. In other embodiments, the entire pulse combustor, including combustion chamber, resonance tube(s) and diffuser section, may be positioned outside the portion of vessel 110 where the reactions occur. In such systems, the pulse combustor remains capable of supplying the endothermic heat of reaction to the reactants within the vessel.

Resonator tube 136 preferably has a water jacket 141 surrounding at least a portion of its length. Diffuser section 140, likewise, may have a water jacket surrounding a portion of its length so that steam may be generated within the jacket for removal of heat and the need for in-bed conduits 160 may be minimized or, in fact, eliminated altogether.

Vessel 110 further includes an overbed coarse fuel and sorbent feed system generally indicated as 170, which preferably utilizes a screw conveyor. Feed system 170 includes a fuel classifier 171 for sorting fines to be fed to pulse combustor means 130 along fuel line 190 from coarse fuel fed to coarse fuel feeder 191 which is later mixed with sorbent fed from sorbent feeder 192 and fed through feed system 170 to form the fluidized bed contained in vessel 110. The sorbent is a material such as crushed limestone that absorbs sulfur-containing substances produced by combustion.

Vessel 110 may include a combustion product or flue gas exit 180 having a gas solids separator/air preheater 182. One or more baffling means to decrease gas bypassing in the gas exit may be located along same. A cyclone 183 may be employed as part of this separating means to further capture solids and regulate the gas and solids temperatures.

Multiple air staging as indicated along lines 195 and 196 from solids separator/air preheater 182 back to vessel 110 may be utilized so that emissions are further reduced.

Waste rock, materials, ash and the like are removed from vessel 110 through port 117 located at the lower end of section 112. Moreover, an ignition system (not shown) may also be provided to vessel 110 for firing the system for start-up and for operational safety.

Figure 4:
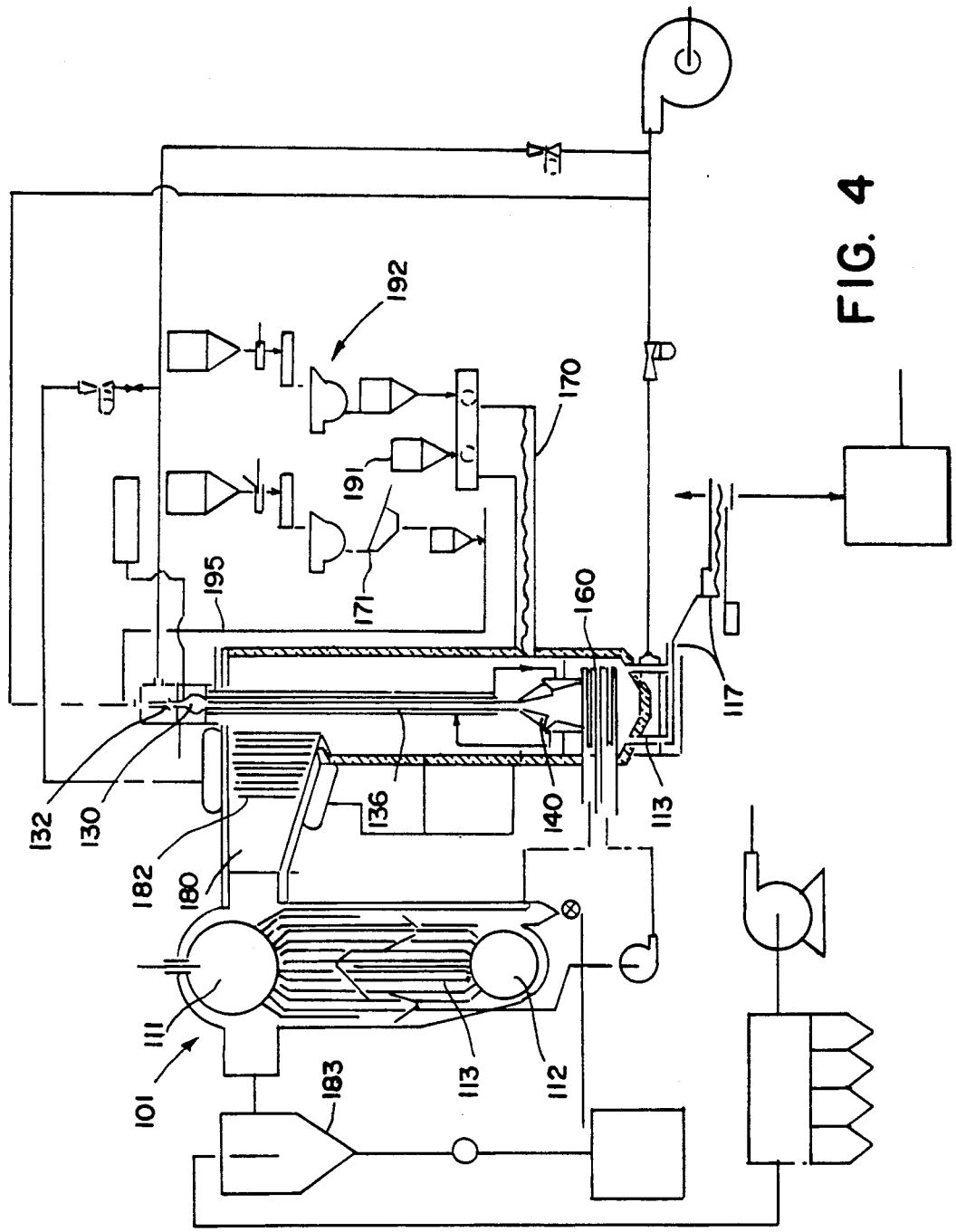
FIG. 4 is a schematic illustration of the pulsed atmospheric fluidized bed reactor of FIG. 3 in a steam generation system environment.

A two-drum steam generation system 101 comprising a steam drum and a mud drum is utilized to avoid elaborate water treatment. Conduits 160, as shown in FIG. 4 and discussed hereinbelow, are connected to two-drum system 101 for creating steam according to this embodiment. The fluidized system for generating steam as described hereinabove operates generally in the same manner as the apparatus previously described.

In FIG. 4, the steam generation apparatus as described with respect to FIG. 3 is illustrated in conjunction with related process equipment with like numbers assigned to like members. After classification of the solid combustible and fluidizable material into fines and coarse particles by classifier 171, coarse particles are transported to coarse fuel feeder 191 and fines are transported along fuel line 195 to pulse combustor 130. Sorbent is added to the coarse fuel by means of a sorbent feeder system 192 and then the combined fuel mixture is fed to vessel 110 by feeding means 170 such as the screw conveyor shown in FIG. 4. The fuel-sorbent mixture falls onto the dense bed located in vessel 110 which is being maintained in a bubbling fluidized state by fluid entering therebeneath through fluid distributor means 113. Fluid distributor means 113 may include a sloping design as shown in FIG. 4 which aids in preventing solid product dead zones. The sloping design in combination with fluid bed drain system 117 also facilitates rock and agglomerate removal.

When pulse combustor 130 is operational, aerodynamic valve 132 pulls in an air-feed mixture on demand. Products from the combustion occurring in pulse combustor 130 proceed with an oscillating acoustic pressure wave through resonance tube or tailpipe 136, through diffuser section 140 and into the fluidized bed. The acoustic wave exiting diffuser section 140 and impacting in the fluidized bed facilitates enhanced mixing and heat transfer. The solid fuel in fluidized state is combusted while temperatures in the bed are controlled by removal of heat through the heat transfer medium passing through conduit or tubes 160 submerged in the fluidized bed.

The heat exchange medium carried in conduits 160 submerged within the fluidized bed are connected to two-drum steam generation system 101 through more conduits arranged in a "D" configuration. Two-drum system 101 comprises a steam drum 111, a mud drum 112 and one or more boiler banks 113. The heat exchange medium, after being sufficiently heated within vessel 110, travels to two-drum steam generation system 101 whereupon the heat exchange medium surrounds steam drum 111, mud drum 112 and boiler banks 113. Water that has been pumped into steam drum 111 is then converted thereby into steam and is released or used accordingly.

Products of combustion also rise above the fluidized bed and into the freeboard zone, where further heat transfer or reaction takes place. From the freeboard zone above the lower section of vessel 110, the heated gases pass to and through an entrained solids separator/air preheater 182 and out flue gas exit 180 to two-drum steam generation system 101. The heat flowing along flue gas exit 180 serves to additionally heat the water contained within steam drum 111 and converts same into steam.

As in the previously described embodiment, the fluidizing medium may be preheated by solids separator/air preheater 182. Moreover, an auxiliary fuel such as natural gas may be used for system start-up (not shown) as described with respect to the previous embodiment. Furthermore, in the steam generation system described, in-bed conduits or tubes 160 may be eliminated and heat exchange may rely completely on heat provided from flue gas exit 180, water-jacketed resonance tube 136 and/or diffuser section 140.

The apparatus of the present invention may also be used for drying materials or heating air. For example, the system may be used as a heat source in place of a coal-fired stoker unit for thermally drying coal. When used in such a manner, different variations of the system are possible such as a water-jacketed fluidized bed, air-cooled tubes embedded in the fluidized bed, and an adiabatic fluidized bed. These three variations differ mainly with regard to the method of cooling the fluidized bed.

Figure 5:
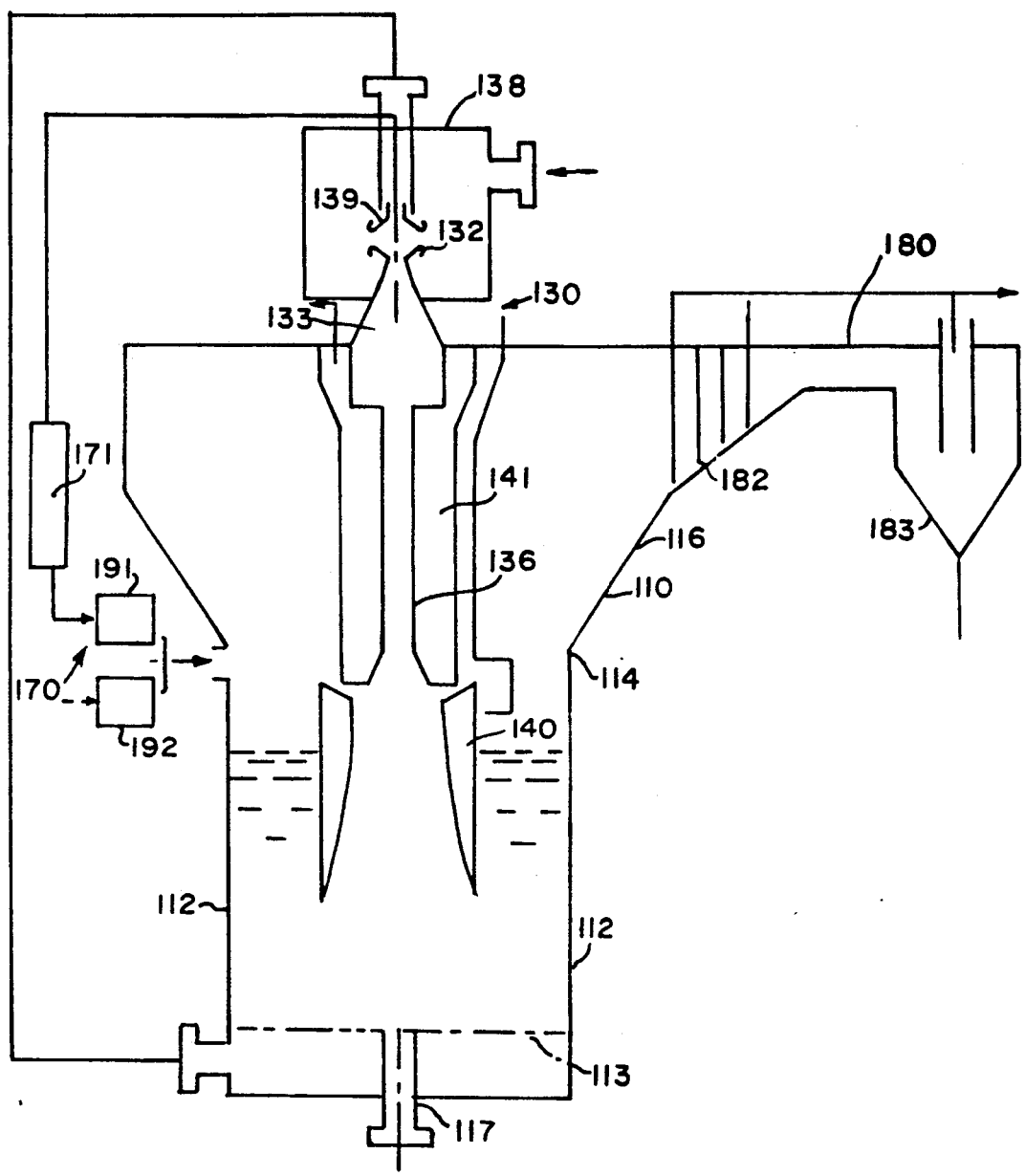
FIG. 5 is a schematic illustration of a pulsed atmospheric fluidized bed reactor for heating air or drying materials according to the teachings of the present invention.

An embodiment of a material drying or air-heating apparatus according to the present invention is shown in FIG. 5 wherein like numerals to those in FIG. 3 represent like members. This embodiment shows the inventive apparatus using a high excess air level to operate the fluidized bed in a near adiabatic mode. This embodiment employs the features of the steam generation apparatus discussed above and shown in FIG. 3 with the exception of the two-drum steam generation system denoted as 101 in FIGS. 3 and 4. Furthermore, drying/air-heating may also be effected without in-bed conduits or tubes 160 shown in FIG. 3.

Refractory-lined vessel 110 minimizes heat loss and the expanded freeboard section decreases gas velocity, increases gas resonance time, and decreases elutriation of fines. A resonance tube or tailpipe 136 surrounded by water jacket 141 eliminates the need for expensive alloys in this embodiment. Moreover, this embodiment preferably employs a water-cooled distributor 113 to minimize thermal stresses and a bed drain 117 to facilitate rock removal and maintain bed height.

Figure 6:
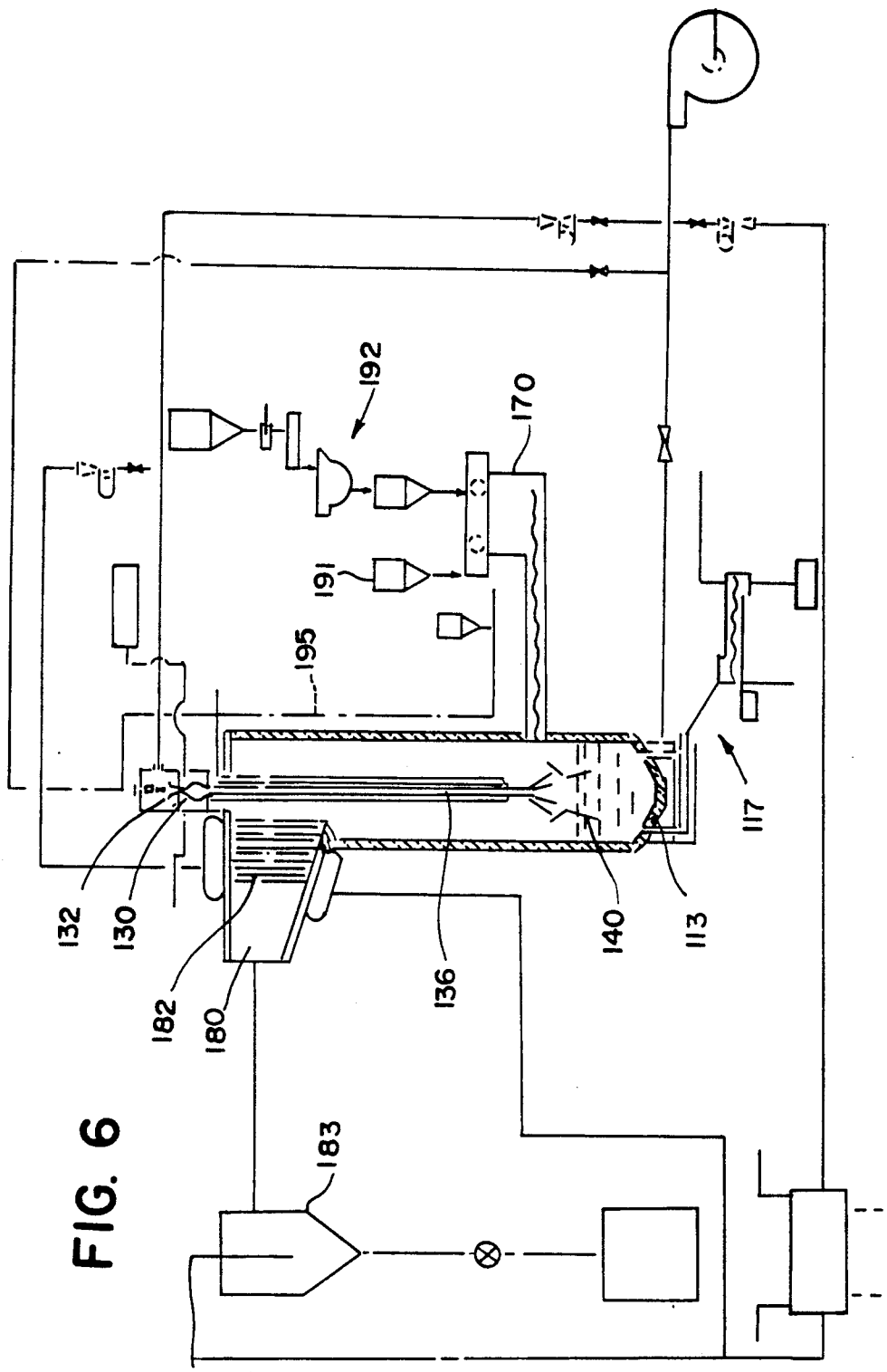
FIG. 6 is a schematic illustration of the pulsed atmospheric fluidized bed reactor of FIG. 5 in an environment for drying materials or heating air.

A process diagram employing the above-described apparatus for air heating or material drying is shown in FIG. 6. The system is essentially identical to the process system described for the steam generation apparatus in FIG. 4 with the exception that the two-drum steam generation system 101 as shown in FIG. 4 is eliminated. Furthermore, the in-bed tubes or conduits 160 shown in FIG. 4 have, likewise, been eliminated.

The present invention may also be employed as a waste incineration apparatus as shown in FIG. 7. This design incorporates means 220 for feeding waste which may include means 214 for feeding the waste materials to the top of the fluidized bed and/or means 215 for feeding waste directly into the fluidized bed depending on the characteristics of the waste used. Rather than being completely integrated with vessel 210, resonance tube 236 of pulse combustor means 230 may be located above Vessel 210. Diffuser section 240 may be located above the fluid bed's splash zone as shown in FIG. 7. A conduit 260 may complete a circuit between thrust augmenter 239 and the portion of resonance tube 236 located above vessel 210 to provide a boost in pressure to thrust augmenter 239. This allows for enhanced mixing within the freeboard section of the reaction vessel.

Like the previously described embodiments, the apparatus of this embodiment comprises a distributor means 213 for maintaining the fluidized bed in a turbulent state, a bed drain system 217 for removal of ash and rock, a solids separator/air preheater 282, means for separating solids from the combustion products and returning the products to the vessel including a flue gas exit conduit 280 and a water-cooled cyclone 283 to capture solids and regulate the gas and solids temperatures so that metal vapors are captured.

A schematic of the system for the waste incineration process utilizing the apparatus shown in FIG. 7 is shown in FIG. 8. Due to possible erosion and corrosion problems of the waste materials relative to the resonance tube and diffuser sections, the resonance tube and diffuser is located above the fluidized bed. Furthermore, due to the same erosion and corrosion problems, immersed in-bed tube banks are not utilized in this apparatus. Like the apparatus previously shown in FIGS. 4 and 6, distributor means 113 is designed with a sloping configuration to prevent solid dead zones and to facilitate rock and agglomerate removal from the bed drain.

Figure 9:
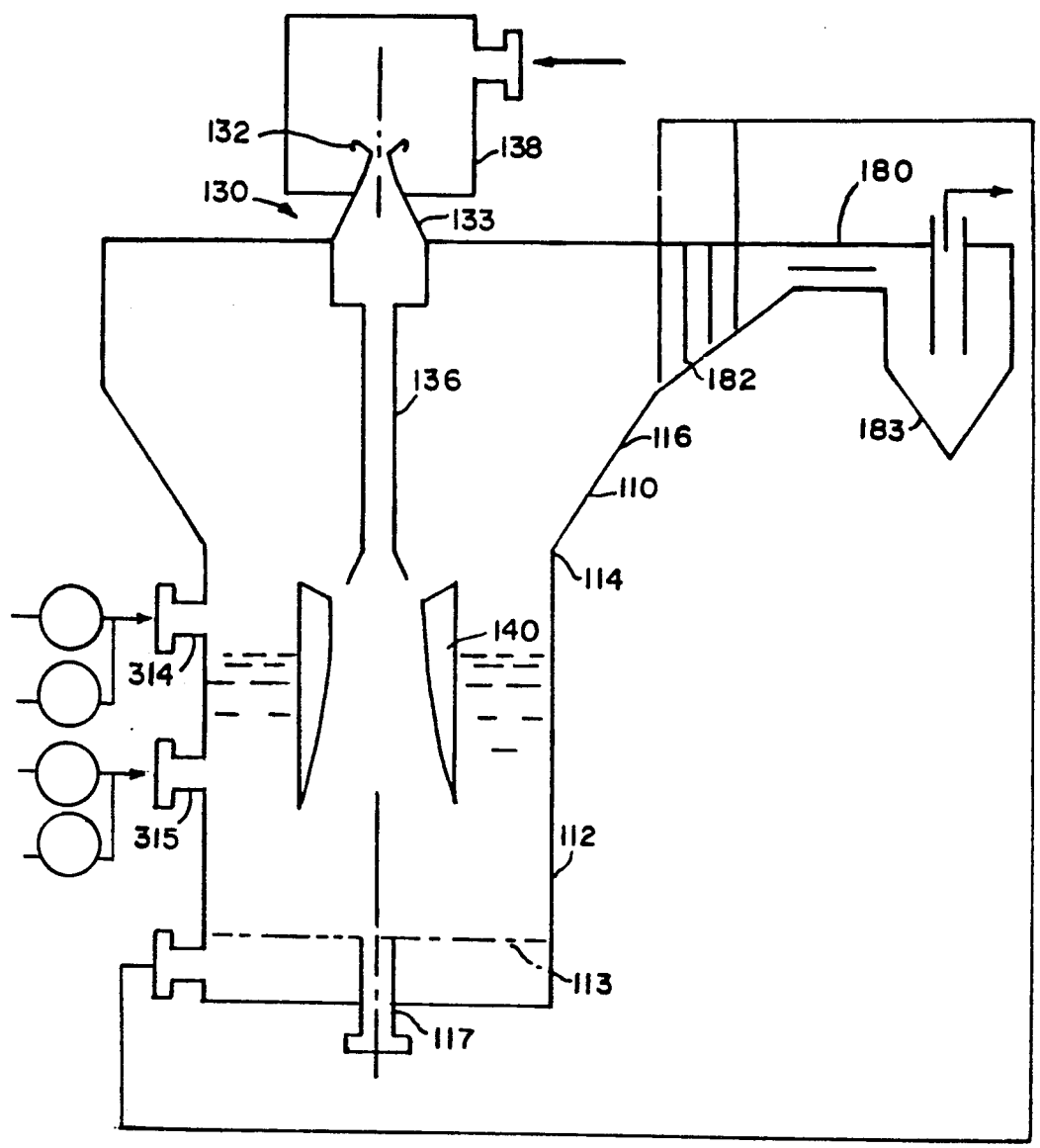
FIG. 9 is a schematic illustration of a pulsed atmospheric fluidized bed reactor for carrying out endothermic reactions such as gasification and calcination.

The present invention may also be used for endothermic reactions such as gasification, calcination, pyrolysis, and partial oxidation reactions. An apparatus designed for these processes is shown in FIG. 9. The apparatus used in this embodiment is substantially identical to the apparatus used for air heating or material drying and shown in FIG. 5, and like numerals represent like members. However, thrust augmenter shown as 139 in FIG. 5 or the water jacket 141 surrounding the resonance tube 136 in FIG. 5 may be eliminated. Additionally, like the apparatus shown in FIG. 7 for waste incineration, the apparatus for carrying out endothermic reactions may include means 314 for feeding the fluidized bed material either overbed or means 315 for feeding directly into the bed.

In such processes, the bed is composed of solid fuels and the pulse combustor provides direct endothermic heat of reaction to produce such products as synthetic fuel gases, calcined products, etc. As with each of the embodiments described herein, the terminal end of the pulse combustor, either the free end of the resonance tube or the diffuser section, may extend into the bed of material or may be positioned apart from the bed.

Although preferred embodiments of the invention have been described using specific terms, devices, concentrations, and methods, such description is for illustrative purposes only. Moreover, those with skill in the art will understand that the components of each of the separate embodiments described herein is interchangeable depending on the specifications of the particular function desired. The words used are words of description rather than of limitation. It is to be understood that various changes and variations may be made without departing from the spirit and scope of the following claimed invention.

What is claimed is:

1. A pulsed fluidized bed apparatus comprising:
   a) a reactor vessel;
   b) means for feeding a fluidizable material into said vessel;
   c) means for fluidizing said fluidizable material to create a fluidized bed of material within said vessel;
   d) a pulse combustor unit in connection with said vessel, said pulse combustor unit comprising a combustion chamber and at least one opening associated therewith for admitting at least one fuel-air mixture into said combustion chamber, said pulse combustor unit further including a resonance chamber in communication with said combustion chamber, said resonance chamber being arranged so that gaseous products from said resonance chamber act on said fluidized bed;
   e) means for transferring heat from said vessel; and
   f) means for transporting combustion products away from said vessel.

2. The apparatus as defined in claim 1 wherein said heat transfer means comprises conduits embedded within said fluidized bed for removing heat therefrom.

3. The apparatus as defined in claim 1 further comprising means for diffusing gaseous output from said resonance chamber.

4. The apparatus as defined in claim 3 wherein said diffuser means is located within said vessel and above said fluidized bed.

5. The apparatus as defined in claim 1 wherein said resonance chamber extends into said reactor vessel so that said resonance chamber is in direct contact with said fluidized bed of material.

6. The apparatus as defined in claim 1 wherein said diffuser means extends into said reactor vessel so that said diffuser means is in direct contact with said fluidized bed of material.

7. The apparatus as defined in claim 1 wherein at least a portion of said resonance chamber is surrounded by a water jacket.

8. The apparatus as defined in claim 1 wherein said pulse combustor unit further comprises means for augmenting the thrust of gaseous products produced by said pulse combustor unit.

9. The apparatus as defined in claim 1 further comprising means for separating solid fuel into fines and coarse solids, means for supplying said fines to said pulse combustor unit, and means for supplying said coarse solids to said fluidized bed.

10. A pulsed fluidized bed apparatus comprising:
   a) a reaction vessel, said reaction vessel having an upper section and a lower section;
   b) means for feeding a combustible and fluidizable material into said vessel;
   c) means for fluidizing said combustible and fluidizable material, said fluidizing means including a distributor device positioned within said vessel so that a combustible and fluidizable material may be placed in a fluidized state by said fluidizing means;
   d) pulse combustor means extending into said vessel, said pulse combustor means comprising a combustion chamber and at least one opening associated with said combustion chamber for admitting one or more fuel-air mixtures thereto, said pulse combustor means further including a resonance chamber in communication with said combustion chamber, said resonance chamber extending toward the lower section of said vessel, said resonance chamber further including diffuser means for reducing the velocity of gaseous products escaping from said resonance chamber, said diffuser means located at the end of said resonance chamber extending toward the lower section of said vessel, and being arranged so that said gaseous products escaping therefrom may act on said combustible and fluidizable material; and
   e) exhaust means in communication with said vessel for allowing combustion products to be removed from said vessel, said exhaust means including means for separating solids from gases and returning said solids to said vessel for further reaction and further including means for removing ash and residue from said reactor vessel.

11. The apparatus as defined in claim 10 wherein said exhaust means is in further communication with a means for generating steam.

12. The apparatus as defined in claim 10 further including:
   means for separating solid fuel into fines and coarse solids, said apparatus further including means for transporting said fines to said pulse combustor and means for transporting said coarse solids to said fluidized bed.

13. The apparatus as defined in claim 11 wherein said steam generation means includes means for supplying water to a steam drum and wherein said steam drum is in communication with a mud drum.

14. The apparatus as defined in claim 10 further including means for transferring heat from said vessel, said heat transfer means including conduits located within said fluidized bed.

15. The apparatus as defined in claim 10 wherein said heat transfer means supplies heat to a system for heating air.

16. The apparatus as defined in claim 10 wherein said heat transfer means supplies heat to a system for drying materials.

17. The apparatus as defined in claim 14 wherein said heat transfer means is in communication with a means for generating steam.

18. The apparatus as defined in claim 10 further comprising a water jacket surrounding at least a portion of said pulse combustor means.

19. A pulsed fluidized bed apparatus comprising
   a) a reaction vessel;
   b) means for feeding waste materials into said vessel;
   c) means for fluidizing said waste materials, said fluidizing means including a distributor device positioned within said vessel so that said waste materials may be placed in a fluidized state by said fluidizing means;
   d) a pulse combustor means extending into said vessel, said pulse combustor means comprising a combustion chamber and at least one opening associated with said combustion chamber for admitting one or more fuel-air mixtures thereto, said pulse combustor means further including a resonance chamber in communication with said combustion chamber extending toward the location of said waste materials within said vessel, said resonance chamber including diffuser means located at the end of said resonance chamber extending toward the waste materials within said vessel such that the velocity of gaseous products escaping from said resonance chamber is reduced, said resonance chamber being arranged so that said gaseous products may act on said waste materials; and
   e) flue gas exit means in communication with said vessel so that combustion products may be removed from said vessel, said flue gas exit means including a means for separating solids from gases in said combustion products and returning said solids to said vessel for further reaction.

20. A process for combusting solid fuel comprising the steps of:
   a) establishing and maintaining a fluidized bed of solid fuel;
   b) pulse combusting a fuel-air mixture so that a pulsating flow of combustion products is created therefrom;
   c) providing said pulsating flow of combustion products for directly acting on said fluidized bed of solid fuel for combustion thereof; and
   d) exhausting combustion products from said vessel.

21. A process as defined in claim 20 wherein said combustion products that are exhausted from said vessel are supplied to a steam generation system for the creation of steam.

22. A process as defined in claim 20 further including the step of circulating a heat transfer medium through a heat transfer means embedded in said fluidized bed so that heat is withdrawn from said fluidized bed thereby.

23. A process as defined in claim 22 wherein said heat transfer means are in communication with a system for generating steam and steam is generated thereby.

24. A process as defined in claim 20 wherein heat created through said combustion is supplied to a system for drying materials.

25. A process as defined in claim 20 wherein heat produced by said combustion is supplied to a system for heating air.

26. A process as defined in claim 20 wherein said solid fuel is a waste material and said process incinerates said waste material.

* * * * *